United States Patent [19]
Wurm

[11] 3,943,058
[45] Mar. 9, 1976

[54] REUSABLE COFFEE FILTER
[75] Inventor: Alfred Wurm, Munich, Germany
[73] Assignee: Interelectric Aktiengesellschaft, Sachseln, Ow, Switzerland
[22] Filed: Nov. 25, 1974
[21] Appl. No.: 526,781

[30] Foreign Application Priority Data
Nov. 28, 1973 Germany............................ 2359348

[52] U.S. Cl.................... 210/456; 210/482; 99/306
[51] Int. Cl.²............................................ B01D 27/08
[58] Field of Search ........ 99/295, 304, 306; 426/77, 426/82, 84; 210/455, 456, 474, 477, 482, 500, 506

[56] References Cited
UNITED STATES PATENTS
2,948,618   8/1960   Saint ...................................... 99/306
3,080,810   3/1963   Saint ...................................... 99/306
3,166,003   1/1965   Merson ................................. 99/306
3,250,398   5/1966   Adiletta ............................... 210/500
3,695,167   10/1972  Schmidt et al. ...................... 99/306
3,770,842   11/1973  Steigelmann et al. ................. 55/16
3,800,690   4/1974   Molenaar et al. ..................... 99/306
3,823,656   7/1974   Van der Veken .................... 99/295

Primary Examiner—Thomas G. Wyse
Assistant Examiner—F. F. Calvetti
Attorney, Agent, or Firm—Frederick E. Bartholy

[57] ABSTRACT

A device for the preparation of filtered coffee is described. It has a permanent filter disk which can be reused, thus eliminating the need for frequent replacement.

3 Claims, 2 Drawing Figures

U.S. Patent   March 9, 1976   3,943,058
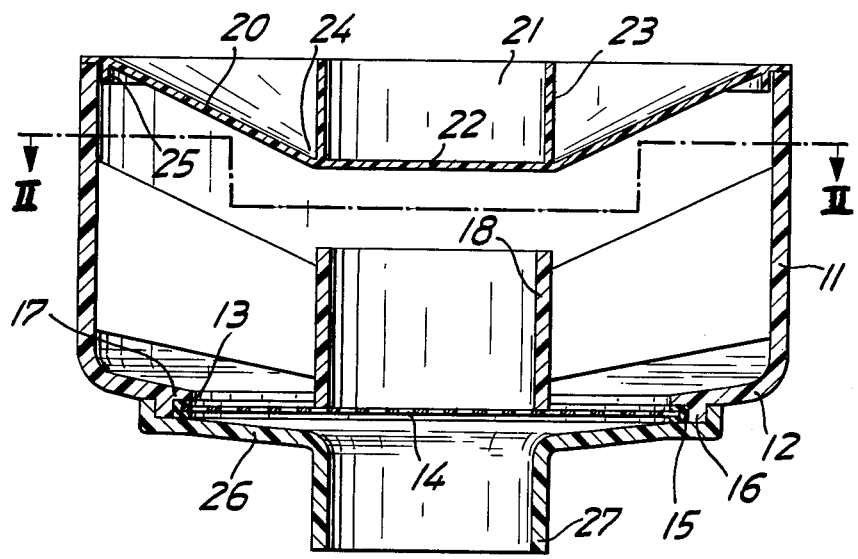
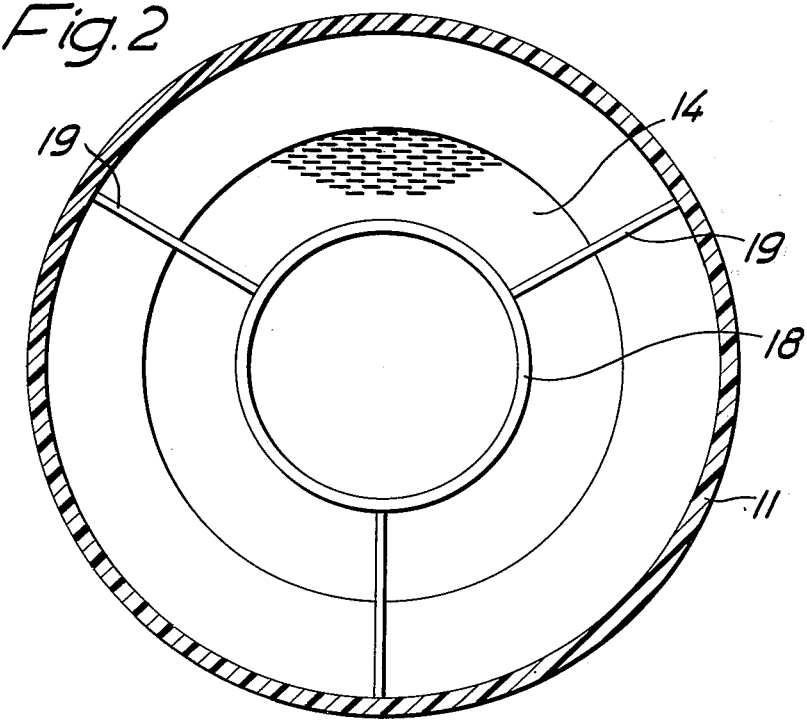

REUSABLE COFFEE FILTER

The invention relates to a device for the preparation of filtered coffee consisting generally of a water container, a receptacle for finely powdered coffee, and a filter disk at the bottom of the container. The disk is preferably made of plastic material which may be electroplated.

Reusable filters for the preparation of coffee have been utilized in the past. A filter element in the form of a sieve is generally placed at the bottom of a container for the coffee and a vessel is provided to pour hot water over the container. Prior art filters are generally made of metal and have proved effective only when the porosity provided satisfactory flow resistance. This is difficult to achieve with metal meshwork.

Reusable coffee filters have been suggested, comprising a pot-shaped hot water container and a filter strainer made of metallic sieve sheets arranged adjacent to an opening in the bottom of the container. Sieve sheets used in these have flared perforations in the direction of flow. The opening in the strainer has a smaller diameter than that of the bottom of the water container. A plate supported on the water container has a plurality of openings distributed over an area corresponding to the vertical projection of the opening of the filter strainer.

The coffee filters of the prior art are efficient only when the containers are filled with a certain quantity of coffee. The tolerances are close.

It is the object of the present invention to provide a reusable coffee filter which results in a good extraction of the coffee powder and a filtering time varying slightly even when the quantity of the contents differs.

The object of the invention is achieved by a water distribution lid over a water container provided with a central water passage of smaller diameter than the active surface of the filter disk. There is also a concentric ring forming a receptacle which is fixed in a fluid-tight manner to the filter disk. This structure divides the latter into an inner and an outer portion. By this means, the hot water passing through the water passage portion of the distribution cover, first flows into the inner portion which holds the coffee powder so that this powder comes into intimate contact with the water and is thereby wetted. When using small filling quantities, a considerable part of the coffee powder stays within the inner portion and, because of the correspondingly smaller water quantity, a considerable portion of the water flows through the inner portion, so that only this portion of the active filter disk is used.

When a larger quantity of coffee is used, the coffee powder lying within a separating receptacle is first penetrated by the water whereby, due to the larger water quantity, a considerable part of the coffee spills over the separating receptacle and reaches the outer portion of the filter disk. This permits the use of the total active surface of the filter disk. In view of the fact that, with a smaller filling quantity, a smaller surface of the filter is used than with a larger filling, the filter times do not differ considerably.

Preferably, the cross-section of the receptacle corresponds to the cross-section of the water passage portion. This results in a uniform wetting of the coffee powder lying within the receptacle.

The coffee container receptacle may be welded at its lower portion to the filter disk. This can be done in a simple manner when, in accordance with the invention, the receptacle is made of plastic material. It may be mounted on the water container by means of laterally extending bars. Preferably, the receptacle, the bars, and the water container are integrally molded of plastic material. Such a construction is easy to manufacture and has considerable mechanical stability.

According to one modification, a funnel-type structure may be affixed to the bottom of the water container so that the coffee filter housing may be placed over a coffee pot or the like.

Other objects and features will be apparent from the following description of the invention, pointed out in particularity in the appended claims, and taken in connection with the accompanying drawing, in which:

FIG. 1 is a front elevational cross-sectional view of a coffee filter device according to the invention; and FIG. 2 is a section taken along line II—II of FIG. 1.

Referring to the drawing, the coffee filter, as seen in the figures, comprises a cylindrical-shaped water container 11 having a bottom 12 defining an opening 13. A filter disk 14 is inserted into this opening. The disk 14 has a reinforced edge 15 which forms a plastic ring around it.

The filter disk 14 is of plastic material and is gold plated by a galvanoplastic method. It is provided with longitudinal slots having a length of between 0.25 and 0.75 inches and a width of between 20 and 100 microns flaring out in the direction of flow.

The edge of the opening 13 is provided with a downwardly-extending annular portion 16 which serves as a peripheral support for the reinforcing ring 15 of the filter disk 14. The ring 15 may be glued or welded to the portion 16, or to the radially inwardly-projecting edge 17 of the water container.

An inwardly-extending tubular structure forms a receptacle 18 for the placement of powdered coffee. The receptacle rests on the filter disk 14 and, by virtue of its smaller diameter, defines a certain central active area thereof. In practice, the receptacle 18 is firmly attached to the disk 14 by any suitable method, depending on the type of plastic material used.

The receptacle 18 is supported within the container 11 by radially-extending bars 19 so that it is firmly held in a position concentric to the container 11.

The above described assembly may be conveniently made by molding so as to form a solid structure, the filter disk 14 being attached to it thereafter.

A water distribution cover 20 is attached to the top of the container 11. It has an inwardly-extending conical portion sloping toward the center, and a flat central portion 22 defined by a tubular wall 23 of such diameter as to correspond to that of the receptacle 18. The central portion 22 has a number of perforations to permit the flow of water into the receptacle 18. A limited number of perforations, indicated by reference character 24, are also placed around the junction of the sloping portion and the tubular wall 23.

By virtue of the above-described structural arrangement, a more efficient water distribution is achieved. When the receptacle 18 is only partially filled with powdered coffee, the water poured into the container 11 is primarily directed through the portion 22 of the tubular inlet 21, toward and into the receptacle 18, whereby the small amount of coffee powder is effectively used and properly filtered over the central area of the filter disk 14.

On the other hand, when the receptacle 18 is completely filled with the maximum quantity of powdered coffee it can accommodate, the water flow will dislodge a certain amount of the contents of the receptacle 18 so that the coffee will spill over outside the receptacle 18. This amount of coffee floats in the water and is deposited onto the outer portion of filter disk 14. The perforations 24 in the water distribution cover 20 direct water toward the outer boundary of the receptacle 18. In this manner, the total area of the filter disk 14 becomes effective and useful.

It is evident that, by virtue of this construction, either the total active surface of the disk 14, or a lesser surface, may be used, depending on the quantity of coffee in the receptacle 18. Consequently, even with different quantities of coffee being used, the filtering time does not vary to a great extent. At any rate, all of the water poured into the container 11 is utilized for extracting coffee from the contents.

A funnel-shaped portion 16, including a downwardly-extending neck 27 is removably attached to the bottom of the container 11. This permits access to the filter disk 14 for occasional cleaning thereof. The neck 27 is of approximately the same diameter as the receptacle 18 and is located coaxially therewith.

The operation in accordance with the invention may also be realized with the filters which are not flat, for example, sieve sheets having the form of a basket, as described in United States Patent Appln. Serial No. 486,626 filed July 8, 1974.

The invention in its broader aspects is not limited to the specific embodiments herein shown and described but changes may be made within the scope of the accompanying claims without departing from the principles of the invention and without sacrificing its chief advantages.

What is claimed is:

1. A filtering device for extraction of coffee by means of hot water, comprising a vessel for accommodating a quantity of water, said vessel having a relatively wide opening at the bottom thereof, a permanent filter disk closing said opening, a cylindrical separating receptacle of relatively smaller diameter than said disk affixed centrally thereto, and a water distribution cover over said vessel, said cover having a water passage opening arranged above said separating receptacle, said opening not exceeding the diameter of said receptacle.

2. A filtering device in accordance with Claim 1, wherein the section of said separating receptacle equals the cross section of said water passage opening.

3. A filtering device in accordance with Claim 1 wherein said separating receptacle is held within said vessel by radially extending bars solidly attached to the inner wall thereof.

* * * * *